United States Patent [19]

Gallo et al.

[11] 4,130,842
[45] Dec. 19, 1978

[54] CIRCUIT FOR GENERATING A DIGITAL, DELETED DATA, BLINKING CROSS SIGNAL WHICH IS STORED IN A DELETED TRACK AND SELECTIVELY DISPLAYED FOR DETECTION

[75] Inventors: Luigi C. Gallo, Redwood City; Junaid Sheikh, Palo Alto, both of Calif.

[73] Assignee: Ampex Corporation, Redwood City, Calif.

[21] Appl. No.: 765,564

[22] Filed: Feb. 4, 1977

Related U.S. Application Data

[63] Continuation of Ser. No. 762,903, Jan. 26, 1977, abandoned.

[51] Int. Cl.² .......................... H04N 5/78; G06F 3/14
[52] U.S. Cl. ......................................... 360/35; 360/14; 360/72; 340/324 AD
[58] Field of Search .............. 364/900 MS File; 360/9, 360/10, 13, 14, 31, 33, 39, 49, 55, 57, 135–137, 72; 340/324 A, 324 AD; 358/127

[56] References Cited

U.S. PATENT DOCUMENTS

| | | | |
|---|---|---|---|
| 2,937,368 | 5/1960 | Newby | 360/31 |
| 3,797,037 | 3/1974 | Kolpek | 360/13 |

Primary Examiner—John C. Martin
Attorney, Agent, or Firm—Robert G. Clay; George B. Almeida

[57] ABSTRACT

A circuit for generating a deleted data signal, which is reproduced as a blinking cross in a television picture, to provide thereby visual indication that a storage location in a video frame store is unoccupied, and available for recording therein. The blinking effect is created by interlacing one diagonal line generated in one field with an opposing diagonal line generated in a second field at the 30 Hertz frame rate. The deleted data signal corresponding to the blinking cross is recorded in the deleted track, e.g., the still location thereof, whereby the store can be interrogated and the deleted data signal suitably displayed to indicate the availability and location of the track for subsequent recording.

8 Claims, 7 Drawing Figures

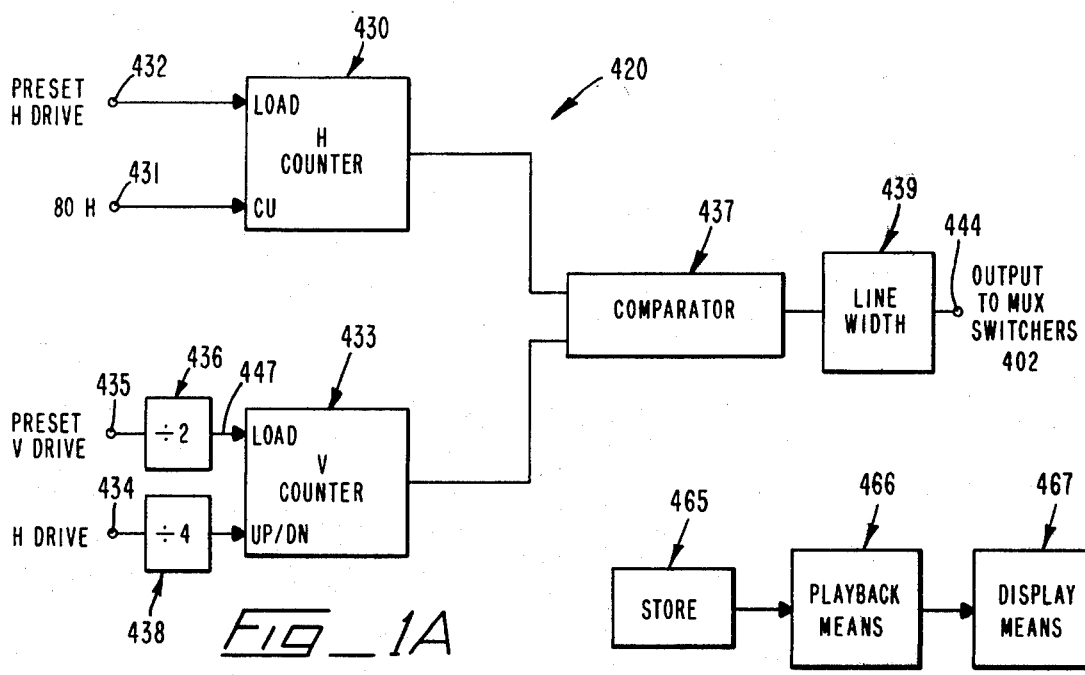
Fig_1A
Fig_1B
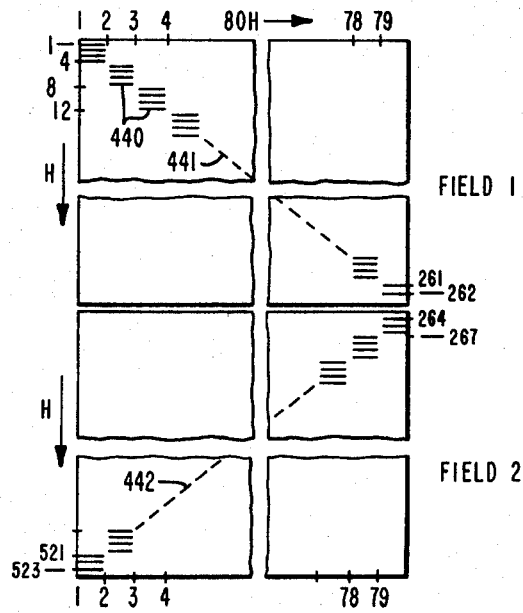
Fig_2

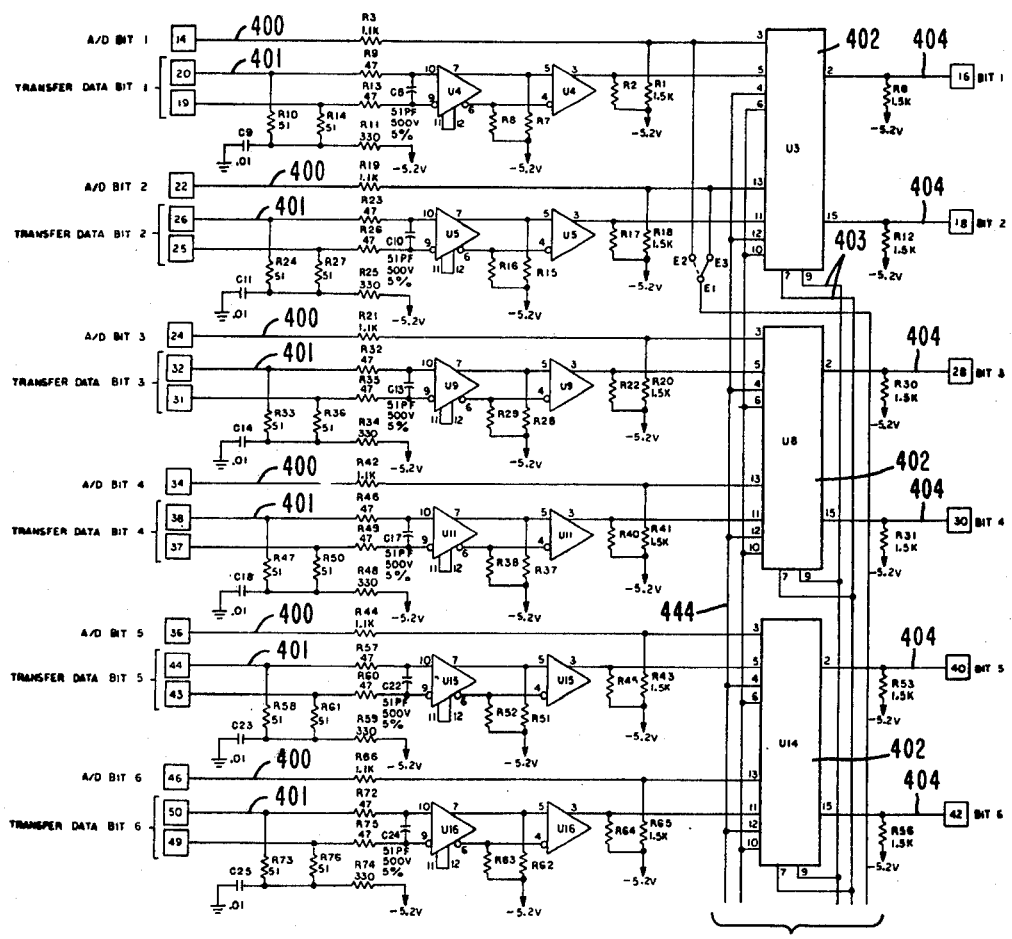
Fig_3A  FIG_3B

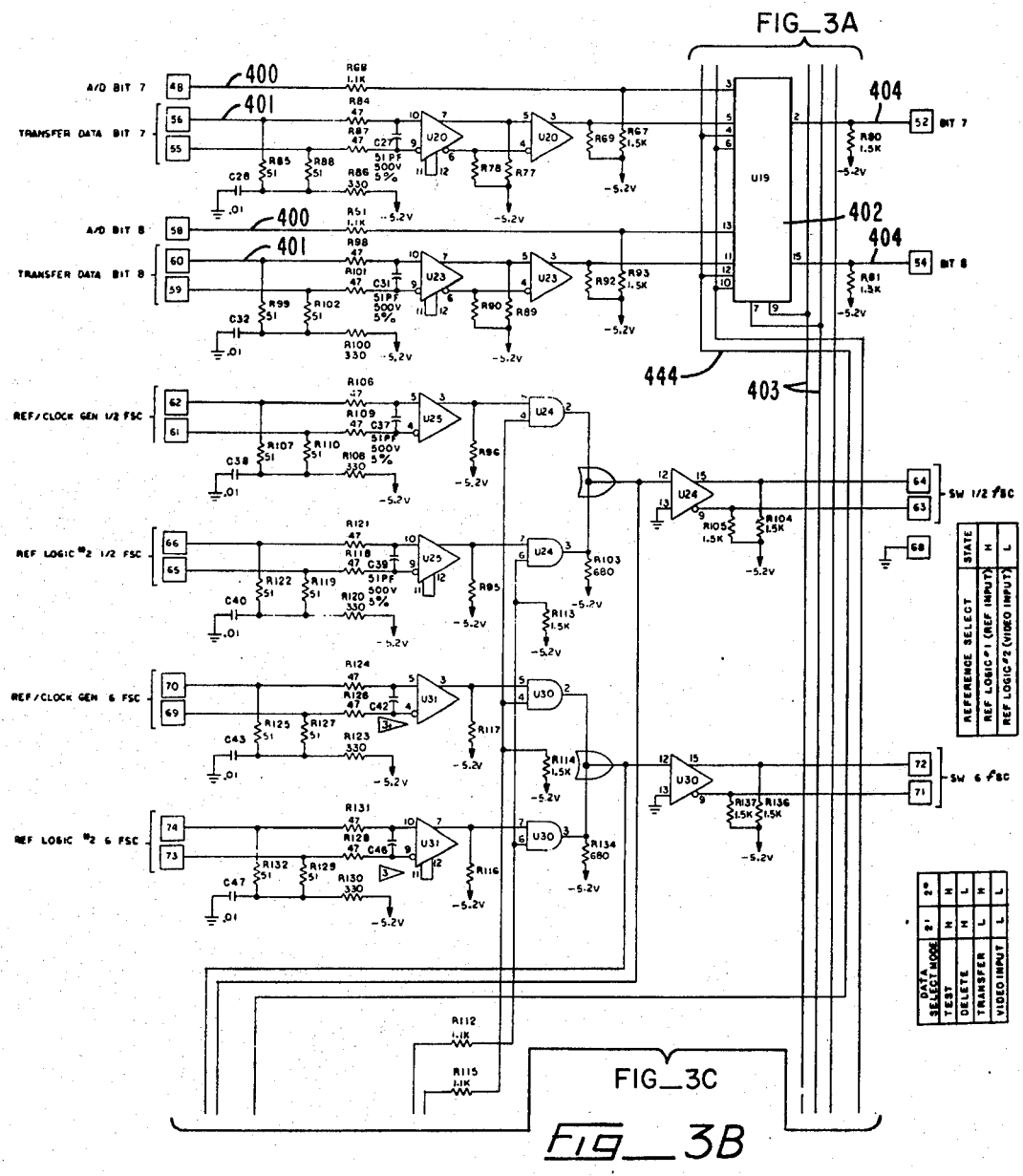

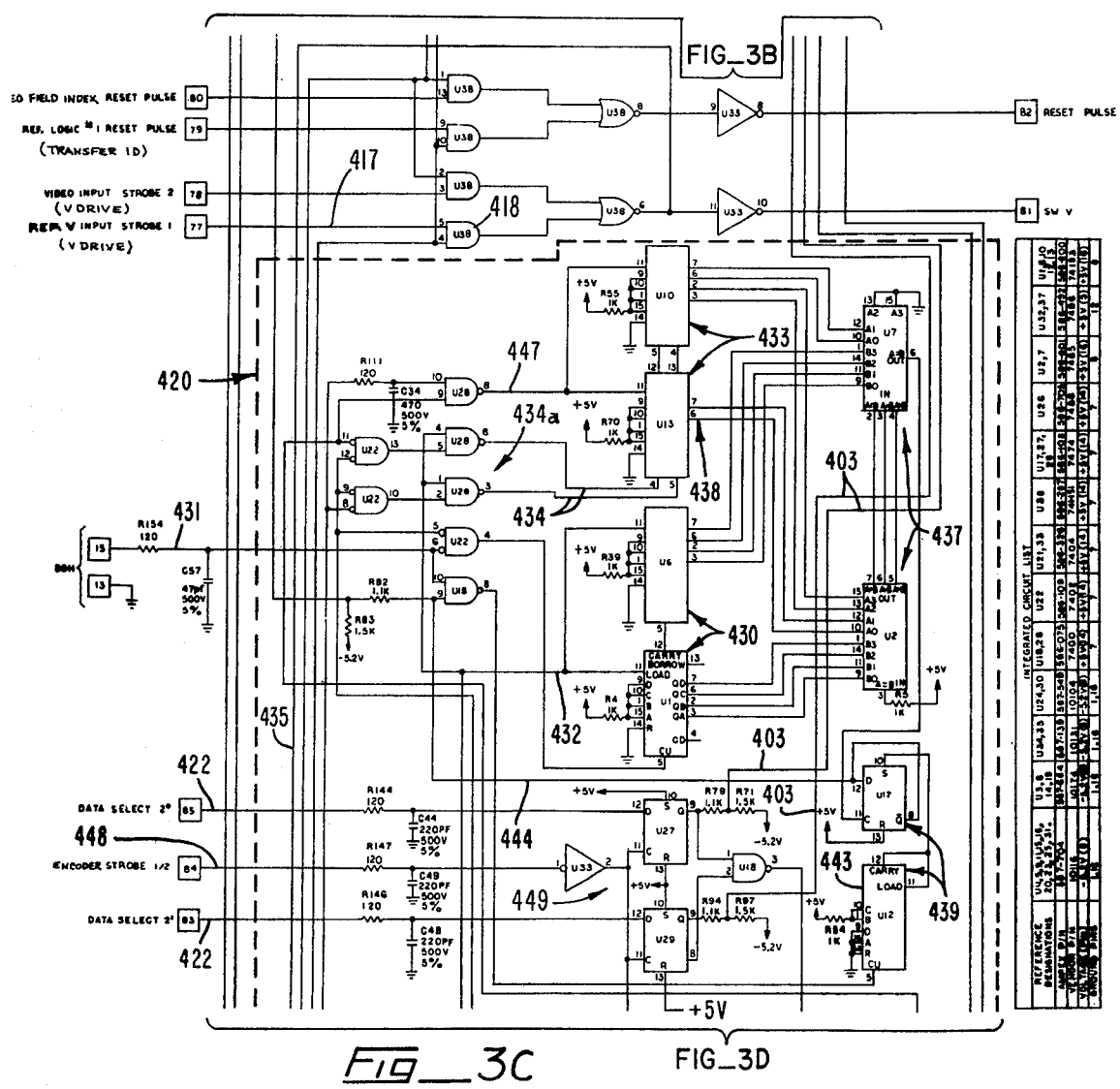

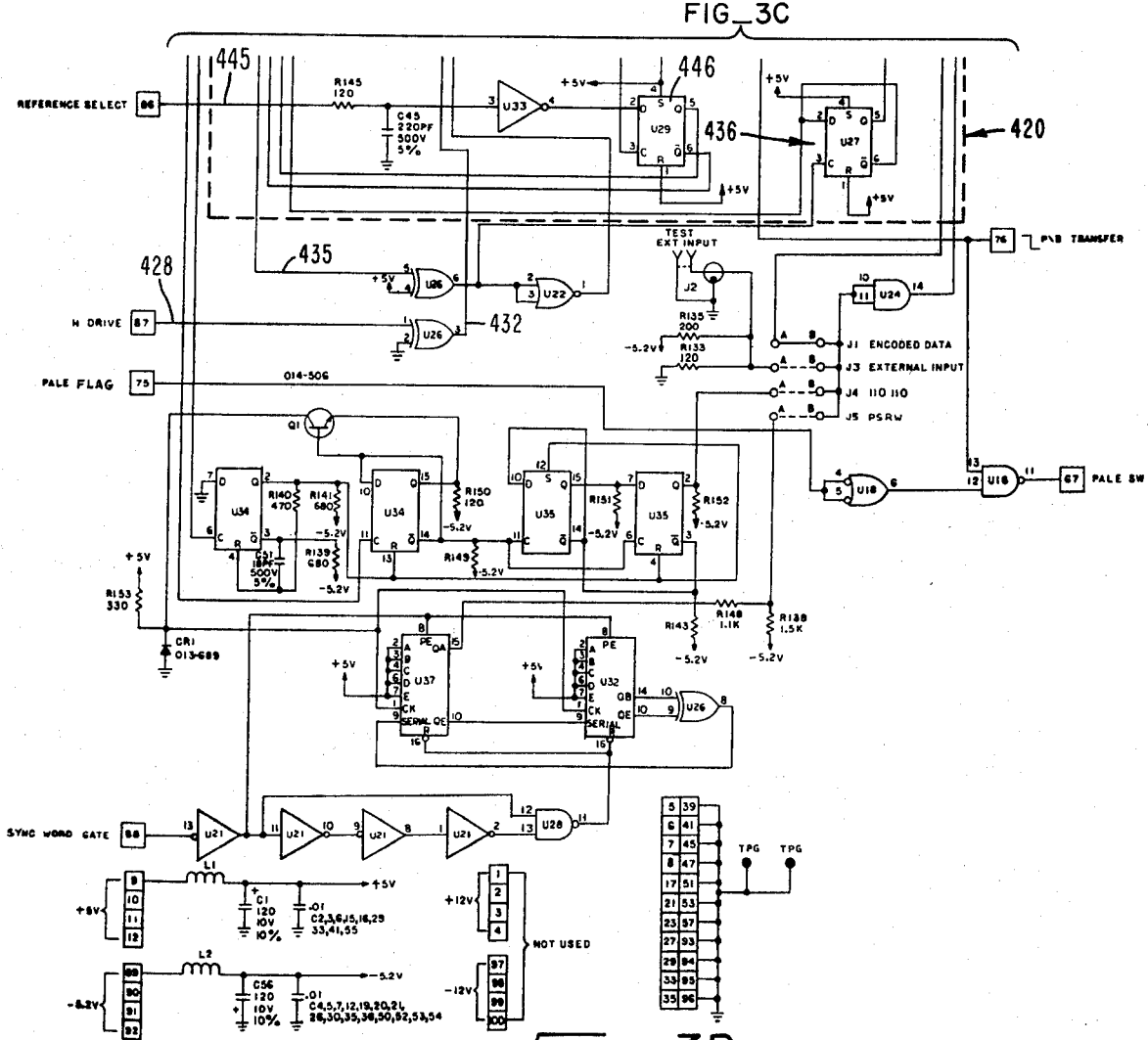

CIRCUIT FOR GENERATING A DIGITAL, DELETED DATA, BLINKING CROSS SIGNAL WHICH IS STORED IN A DELETED TRACK AND SELECTIVELY DISPLAYED FOR DETECTION

CROSS-REFERENCE TO RELATED APPLICATION

This application is a continuation of Ser. No. 762,903, filed Jan. 26, 1977, and now abandoned.

BACKGROUND OF THE INVENTION

1. Field

The invention relates to circuits for indicating that data has been deleted in a video frame storage track, and particularly to a circuit for generating a digital, data deleted, word corresponding to a selected deleted data display, which word is recorded in the storage track to indicate the track is available for recording.

2. Prior Art

Present video data storage systems for the most part utilize an analog format wherein the storage and retrieval of stored data is performed by continuously recording and storing the data in a magnetic disc, tape, etc., in short time segments, as in a disc stop/slow motion recorder/reproducer, in a cassette or a reel-to-reel recorder/reproducer, etc. The data location is identified by various edit markings made with pre-recorded cue tones, etc. It is becoming customary to control the recording, storing, interrogation or playback processes with computer means interfaced with the storage system. Ordinarily, tracks, blocks, or lengths of a disc, tape, etc., which contain data no longer required, are generally identified by the computer in a deleted data list stored in memory to provide an indication that the respective storage tracks, or blocks thereof, contain useless data and are available for subsequent recording of new data. Thus the data to be deleted is not erased when it is no longer required, but is instead obliterated with new data recorded over the useless data and stored at the identified location. In such systems, it is possible to interrogate the old data via computer and not know whether the data is up-to-date, useful, or deleted data.

Recent developments in the digital data storage area provide for the digital storage of television fields or frames, particularly as in circular tracks on rotating disc means. In such systems, it is highly desirable to provide some random access means for identifying any tracks in which the data is to be or has been deleted, such that upon interrogation thereof a readily visible, audible, or electronically detectable indication of the track availability is generated. A visual indication is particularly desired in a television signal storage system used for providing still displays so that the operator of such a system is able to readily distinguish between tracks containing useful data and tracks not containing useful data. While tracks containing television data no longer needed can be erased, if playback of such a track is requested, the display during such playback will be blank. Blank displays will also occur for some system malfunctions. Providing a visible indication on the display of a deleted track of data provides a convenient way of distinguishing a deleted track of data from a malfunction.

SUMMARY OF THE INVENTION

The present deleted data signal generator overcomes the above shortcomings of the prior art by providing a readily visible, audible or electronically detectable indication of a deleted track of data, while further providing the advantages inherent in the condition that the data deleted signal is recorded in the storage track itself. The data deleted signal herein comprises a distinctive signal which when played back and displayed is readily identified and distinguished from data ordinarily stored in the tracks. In a preferred embodiment, a blinking cross formed of opposite diagonal lines across a television picture is utilized as the data deleted signal. Interrogation or playback of deleted track regions thus readily detects the stored delete word, which is simultaneously suitably reproduced herein as the blinking cross in a television picture display monitor. To this end, horizontal and vertical counters are clocked by respective horizontal drive signals through a preselected number of counts, which in effect divides the television picture into an X-Y matrix. A digital comparator is coupled to the counters and generates an output pulse upon detecting a point of coincidence corresponding to the counters incrementing equal counts. The output pulse corresponds to a white level, while no coincidence fails to generate a comparator output, indicating a black level. The counters are clocked in synchronism to generate a diagonal line from corner-to-corner across the matrix or picture during a first field, and an opposing diagonal line from corner-to-corner during a second field. The resulting crossed diagonals define a readily visible blinking cross, which flickers at 30 Hertz, i.e., one-half the field rate. The blinking cross is recorded as a digital signal in a deleted storage track to indicate a data deleted condition. The deleted storage tracks are readily detected subsequently whenever interrogated. The corresponding blinking cross is visually displayed simultaneously during interrogation or playback to indicate the availability of storage areas.

One embodiment of the invention was specifically adapted for use in conjunction with an overall television signal storage apparatus which is the subject matter of a U.S. application entitled "Video Frame Storage Recording and Reproducing Apparatus," by J. P. Diermann and T. W. Ritchey, Ser. No. 763,371 (ID-2559) filed on Jan. 28, 1977 and assigned to a common assignee.

It is an object of the invention to generate a digital deleted data word representing a blinking cross, or like distinctive geometrical pattern, picture, etc., for storage in a deleted data region, such as a track of a video frame store.

Another object is to provide a blinking cross display corresponding to the digital deleted data word, by generating opposing diagonal lines in alternate fields to visually indicate the deleted data signal.

A further object is to provide a visual, audible or electronically detectable indication corresponding to a digital deleted data word recorded in a deleted data region of a storage system.

BRIEF DESCRIPTION OF THE DRAWINGS

FIG. 1A is a block diagram of the deleted track, blinking cross signal generator.

FIG. 1B is a block diagram of the interrogating and-/or playback means with display of the stored deleted data word.

FIG. 2 is a diagrammatic representation of the cross produced by interlacing two television fields.

FIGS. 3A–D together are schematic diagrams of one embodiment of the delete signal generator of FIG. 1A as employed in television encoder circuitry.

DESCRIPTION OF THE PREFERRED EMBODIMENTS

Although the present invention is described with reference to the generation of a blinking cross geometry, it is understood that other geometrical arrangements, pictures, etc., may be used as the deleted data signal, wherein a portion of the display may be generated in one field, with the remaining portion being generated in the alternate field, to cause a readily visible flicker at the 30 Hertz rate. The entire display may be generated in one field if the flickering effect is not desired. However, encoding the deleted data signal to cause a visible flicker upon its display facilitates generation of a distinctive deleted track signal since displays of visual information typically do not flicker. For the television signal storage apparatus described in the aforementioned application Ser. No. 763,371, the flicker effect is conveniently obtained by separating parts of the deleted data signal in each of the two television fields recorded in the track of deleted data. It should be appreciated that other techniques can be employed to reduce the repetition rate of the deleted data signal and produce the flicker effect, such as by encoding one of the two television fields with the complete cross while leaving the other field devoid of information.

In addition, a display other than visual may be generated. For example, in a video storage system where audio signals may be recorded in video tracks, the playback deleted data signal would be "displayed" as an audible tone. In a computer oriented, data storage system employing a file of deleted data regions, the computer may be arranged to electronically interrogate and detect the deleted data signals recorded in the deleted tracks, with an electronically detectable display provided, if desired. In the system illustrated herein, the display is visual, and the deleted data word is interrogated in playback.

Referring to FIG. 1A, the circuitry 420 for generating the deleted track, blinking cross signal is shown in block diagram, with FIG. 2 depicting a pictorial representation of the front view of two fields of a television picture which exemplifies a visual display of the deleted data signal generated via the playback means of FIG. 1B. A horizontal (H) counter 430 counts down from a preset count in response to an 80H clock which is obtained, for example, from a television reference signal synchronization generator (not shown) commonly employed with television equipment and which inputs on line 431. The 80H clock is at a frequency of 80 times the reference H sync rate. H counter 430 is preset every horizontal line by an H drive or reference H sync signal which is received over a line 428 (FIG. 3D) and inputs to the counter on line 432. A vertical (V) counter 433 counts up and down in response to the H drive signal steered onto one of the input lines 434 to the counter 433 by steering gate circuitry 434a (FIG. 3C). The V counter 433 is preset after every other field by a preset command placed on line 447 by a divide-by-two flip-flop 436 (FIG. 3D). The preset command is generated from the V drive signals provided by the reference synchronization generator of previous mention over line 417. The embodiment of the deleted track signal generator circuitry 420 shown in FIGS. 3A through 3D is arranged for use in one of several modes of operations performed by the apparatus subject matter of the aforementioned application Ser. No. 763,371. When the apparatus is operated to record the blinking cross provided by the generator 420, a reference select signal line 445 receives a signal that is strobed into a latch 446 by a strobe signal received over line 448. The latch 446 places an enabling signal on one of the inputs of an AND gate 418 so that the V drive signals present on line 417 at the other input are placed on the line 435 extending to the input of the flip-flop 436.

For purposes of forming a preferred geometrical blinking cross shape, a divide-by-four ($\div 4$) means 438 is coupled to the input of the V counter 433 so that four H drive signals must be received to change the count state of the V counter. The divide-by-four means 438 is conveniently formed by shifting the output connectios of the V counter 433 by two bit positions (FIG. 3C). With the V counter 433 connected in this manner, the state of its output will change upon receipt of every fourth H drive signal whether counting up or down.

A digital comparator 437 is coupled to the H counter 430, and to the V counter 433. A line width generator 439 is coupled to the comparator, and the output therefrom comprises the digital signal corresponding to the detection of coincidence between the H and V counters, and defining a white level signal. The digital output is herein introduced via line 444 to a plurality of multiplexer switches 402, shown in FIGS. 3A–B; and further described infra, which define means for introducing the deleted track signal to an associated video frame store (not shown).

In operation, referring also to FIG. 2, the television picture is divided into an X and Y matrix. For example, the horizontal direction is divided into 80 counts, and the vertical direction is divided into a number of counts corresponding to the lines contained in a field. When the corresponding H and V counters increment equal counts, the comparator 437 detects a point of coincidence and generates a "1" output pulse corresponding to a white level. When no coincidence is detected, the comparator generates no output, corresponding to a "0" or black level. Both counters 430, 433 are preset via their respective preset inputs, H drive and V drive, the latter being divided down by two to preset the V counter 433 every other field. In the first television line of the first field, the H counter 430 is clocked from 0 through 80 by the 80H clock. The preset V counter 433 and $\div 4$ means 438 are incremented by the first clock pulse of H drive indicating television scan line 1, and as the H counter clocks the first clock pulse, coincidence between the outputs of the counters occurs. This defines point 1—1 of the X-Y matrix, which corresponds to the upper, left corner of the raster of horizontal lines forming the displayed field.

The line width generator 439 includes a counter 443 (FIG. 3C) which counts to a pre-determined number to cause a logical "1," i.e., a white level, to be successively generated as the digital output on the output line 444. This causes a short line segment to be generated from the initial point of coincidence, as depicted at 440 of FIG. 2. Since the V counter input is divided by four, after the counter 433 is clocked out of its preset state by the first clock or H drive pulse, it takes four H drive pulses to increment the V counter 433 again. Thus, four successive television lines are scanned on the same output pulse of the V counter 433, whereby lines one through four are in coincidence with the first clock pulse of the 80H clock as it counts the duration of the horizontal line. Thus, four short line segments 440 are generated side-by-side on four adjacent television lines. When the fifth H drive pulse is received, the V drive counter 433 is incremented one count and, for the next four H clock pulses, causes the generation of short line segments for another four horizontal lines, but one count later in the H counter 430 count cycle.

This leads to the generation of the diagonally extending series of diamond shapes, which define the diagonal line 441. After every fourth horizontal line, H drive increments the output of V counter 433 one count (to count 2 and so on) which is maintained over the next four television lines. The 80H clock increments H counter 430, whereby coincidence occurs at point 2 during lines 5-8, at point 3 during lines 9-12, etc. The process continues with the point of coincidence moving along a diagonal across the display until the diagonal line 441 ends at the lower right corner of field 1 with television lines 261-262. At this point, no outputs are generated since this is the time period corresponding to the vertical interval.

On the second field, data corresponding to an oppositely directed diagonal line 442 is inserted into the signal. The diagonal lines 441, 442 are purposely drawn on alternate fields to provide a readily visible flicker or blink of 30 Hertz rate, upon playback and display of the recorded blinking cross signal.

Beginning the second field, the V counter 433 is maintained at the count incremented at the end of the first field. However, the steering gate circuitry 434a causes the H drive signal related pulses to be steered onto the other of the input lines 434 to the ÷4 means 438 and V counter 433 as a result of clocking the flip-flop 436 by another V drive related signal placed on line 435 at the end of the first field (FIGS. 3C-D). The V counter now counts back down from its coincidence point count. For the second field, this corresponds to the upper right corner of the field (which corresponds to its last point at the lower right corner of field 1), as it would be displayed on a television picture monitor. Since the field raster scan always begins at the top of the displayed raster of horizontal lines and scans the lines sequentially to the bottom, the first full horizontal line scanned will be across the top of the displayed raster of field 2, as shown in FIG. 2. The H counter 430 operation is unaffected by the V drive signal and continues counting the received 80H signal. The ÷4 means 438 and V counter are not incremented until receipt of the H drive or clock pulse at the beginning of the third full line of the second field. During this line the H counter counts until it reaches a count of 79, at which time coincidence with the V counter 433 occurs. Thereupon, the comparator 437 generates logical "1" bits (white level) to be inserted in all the data bit lines via multiplexer switches 402 (FIGS. 3A-B) whose duration or line segments length is determined as before by the line width generator 439. The diamond shapes are drawn on the picture along the opposite diagonal, forming the diagonal line 442 from right to left, since the V counter counts down whereby each subsequent coincidence is earlier than the previous one. Due to the V counter 433 not being incremented until the fourth full line, i.e., line 267 in the second television field, the diagonal line 442 is actually shifted slightly to the left of the true diagonal. However, this slight shift is insignificant to the purpose served by the blinking cross and is not noticeable to the observer except upon very close inspection of its display.

The ÷4 means 438 and the line width generator 439 are employed herein to properly determine the angle of the diagonal and to form the diamond shapes which define a thicker, more symmetrical line. However, the above conditions are imposed by the limited input signals available; viz, the 80H signal. If a signal of, for example, 262H were available, the matrix may constitute a 262 by 262 grid and the H and V counters 430, 433 may be arranged to increment together while drawing the diagonal lines 441, 442 from corner to corner, without need for mathematic compensation such as the ÷4 means 438.

The two fields are herein illustrated in FIG. 2 with one below the other to facilitate understanding the manner in which the diagonal line 442 of the field 2 is formed; i.e., to generate a display from top-to-bottom and right-to-left. The fields are, in fact, actually interlaced on the same television display device, and thus the diagonals are superimposed from field to field at the 30 Hertz rate to define the readily visible blinking cross.

The output from the line width generator 439 is introduced to circuit means for generating a digital deleted track word, which herein is a timed series of "1" bits corresponding to the white level. Such a means is exemplified by the multiplexer switchers 402 of FIGS. 3A-B, wherein the output line 444 of the line width generator 439 is selected for parallel passage through the switchers on output lines 404 thereof, by the 2-digit command introduced thereto via latch command lines 403, in response to data select 2° and 2' inputs 422 and strobe ½ clock input 448 from a computer control system included in the apparatus of the aforementioned application Ser. No. 763,371, the 2-digit command being set into the latch circuit 449 and thereby placed on lines 403 by the strobe clock. The delete word on lines 404 provides an input, for example, to a video frame store, which word is processed for recording in the same manner as a video signal received over lines 400 or 401 from an upstream analog-to-digital converter (not shown). The blinking cross signal is recorded in a storage track when a previous record is deleted, and provides visual means to indicate that the storage track is available for recording a subsequent video signal. If a request to play back data from a thusly identified track is initiated, the delete signal, and thus the blinking cross, is interrogated and reproduced in the same manner as when reproducing a field or frame of stored video.

The various components 430-439 and 444 of the blinking cross generator 420 of FIG. 1A are shown in schematic diagram in FIGS. 3A-D wherein like components are similarly numbered. Thus the H and V counters 430, 433 comprise a pair of four bit counters, wherein the output connections of the V counters 433 are shifted two bit positions to provide the divide-by-four function depicted at block 438 of FIG. 1A. The digital comparator 437 provides a carryout pulse upon detecting a point of coincidence of the counters 430, 433, while the line width generator 439 provides the white level output via line 444 thereof, for a selected time period corresponding to the preset number of counts made by the counter 443 thereof representative of the desired length of the short line segments 440 (FIG. 2) forming the diamond shapes of the diagonal lines 441, 442. The (eight bit) digital delete word is formed herein via the (eight) output lines 404 of the multiplexer switchers 402, as previously mentioned.

FIG. 1B represents an embodiment of means for interrogating and playing back the deleted data signal stored in deleted tracks of a storage means 465. Playback means 466 such as a tape reproducer, disc playback, etc., reproduces the data deleted signal as it would the stored video information, and introduces same to a suitable display means 467, such as a television picture, an audio circuit, a computer readout device, etc.

We claim:

1. A circuit for generating and displaying a deleted data signal representative of tracks in a storage system from which undesirable data have been deleted, comprising the combination of;

circuit means for generating a plurality of digital words definitive of the deleted data signal, the arrangement of said plurality of digital words being distinctive relative to the undesirable data which is deleted and the data which has not been deleted from said storage tracks;

means for interrogating the distinctive plurality of digital words definitive of the deleted data signal; and new means for displaying the deleted data signal to show that the corresponding storage track is available for subsequent recording of new data.

2. The circuit of claim 1 wherein the circuit means further includes means for recording the plurality of digital words defining the deleted data signal in the storage track from which the undesirable data are deleted.

3. The circuit of claim 2 wherein;

said means for interrogating comprises playback means for reproducing the stored plurality of digital words; and wherein the deleted data signal represents a visual image of a selected pattern, and the displaying means includes a television display for receiving and displaying the visual image represented by the deleted data signal.

4. The circuit of claim 3 wherein television data signals are recorded in the storage tracks and the deleted data signal is a distinctive television data signal, a portion of the deleted data signal occurs during one field, and the remainder thereof occurs in another field, said fields are successively coupled to the recording means for recording in a storage track from which data is deleted, and said playback means alternately reproduces the fields forming the deleted data signal to provide upon display a readily visible blinking image.

5. The circuit of claim 3 wherein the circuit means for generating the plurality of digital words includes;

horizontal and vertical counter means for generating an X-Y matrix commensurate with a television picture display in response to selected clocks coupled thereto;

comparator means for detecting a point of coincidence of the counting state of the horizontal and vertical counters and for generating a digital output indicative of the coincidence;

means coupled to the comparator means for forming the digital words from successive points of coincidence of the counters, to define the deleted data signal; and wherein the means for recording receives and stores the digital words in the deleted data storage area for subsequent interrogation and reproduction by the playback means.

6. The circuit of claim 5 wherein the deleted data signal is an interlaced television data signal representing a distinctive image, and the vertical counter is commanded to count up during one television field interval to generate a selected portion of the image signal and is commanded to count back down during the succeeding field interval to generate the remaining portion of the image signal.

7. The circuit of claim 6 wherein the counters are incremented to generate the digital words corresponding to a diagonal across the television picture during one field, and are incremented to generate the digital words during the second field which correspond to an opposite diagonal across the picture, said image constituting crossed diagonals.

8. The circuit of claim 7 further including a line width generator coupled between the comparator means and the digital word forming means responsive to the digital output of the comparator means following each count state coincidence of the counters for generating a digital output signal of a selected duration, said digital output signal corresponding to said digital output of the comparator means.

* * * * *